Hal Weir McPherson
INVENTOR.
BY

Patented Nov. 4, 1952

2,616,770

UNITED STATES PATENT OFFICE 2,616,770

BEARING MOUNT

Hal Weir McPherson, Chicago, Ill.

Application March 9, 1949, Serial No. 80,510

7 Claims. (Cl. 308—191)

This invention relates to bearing mounts, particularly those employed in hydraulically operated turbines or rotatable devices such as water-driven sewage and garbage disposal devices.

There are many well known bearing mounts, some of which have been employed in related devices; but, each has limitations for the preferred use of the bearing mount of this invention.

An object of this invention is to provide a new and improved bearing mount.

Another object of this invention is to provide a new and improved water-proof bearing mount of the class described.

Another object of this invention is to provide bearing mount that is characterized by a "diving-bell seal."

A still further object of this invention is to provide a device of the class described which is simple to build, economical in service, and possessed of great durability.

The foregoing and other objects and advantages of this invention will be more fully understood from the following specification in conjunction with the drawings forming a part thereof, wherein.

Figures 1, 2, 3:
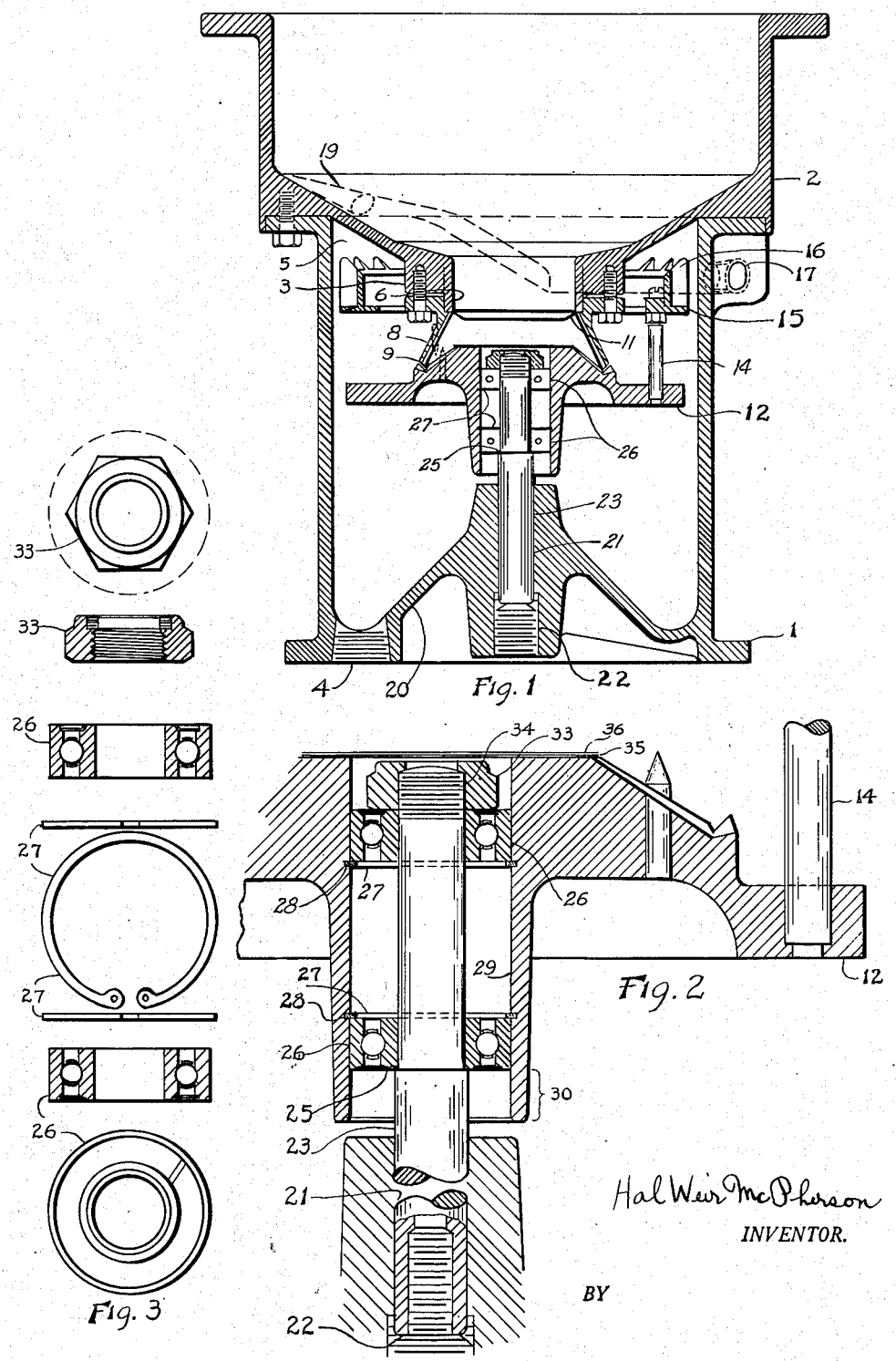
Fig. 1 is a vertical cross-sectional view of a hydaulic sewage and garbage disposal device with the bearing mount of this invention employed therein.
Fig. 2 is an enlarged view of the bearing mount as illustrated in Fig. 1.
Fig. 3 is a view of the nut, retaining ring, and ball bearing assemblies.

In the drawings, wherein like members are given the same reference numeral, a shell or supporting member 1, having an outlet 4, has positioned thereon, in water-tight relationship, a bowl 2 having a design such that a portion 3 thereof extends or projects into said shell 1 and defines a channel 5 with the side wall thereof. This projection 3 of the bowl 2 is provided with a concentric outlet 6. Positioned to register with the outlet 6, and secured to the projection 3 is a hollow member 8 having a cutting and grinding surface 9, preferably frustro-conical in shape with longitudinal teeth in the form of an Archimedes spiral. Intermediate the outlet 6 of the projection 3 and hollow member 8 is a kicker plate 11, which may be a separate member or integral with the projection 3 or hollow member 8, designed to deflect water from the bowl towards the longitudinal axis of said hollow member 8.

Supported from the base of said shell on the bearing mount of this invention and in spaced relationship with said hollow member 8 is a rotatable member 12, preferably frustro-conical in shape and having teeth which are also in the form of an Archimedes spiral. Secured to said rotatable member 12 in any suitable manner, such as by rods 14, is a water wheel 15 positioned in the channel 5 defined by the side wall of the shell 1 and the projection 3 of the bowl 2. The water wheel is preferably of the tangential flow type, such as the Pelton wheel illustrated.

An inlet 17 is provided in the shell 1, whereby water under pressure is directed against the impellers 16 of the water wheel 15, and tangential to the outer periphery of the wheel proper, to rotate the wheel and all rotatable parts connected therewith. An arcuate conduit 19 is provided in the side walls of said shell 1 and bowl 2. The opening of the conduit 19 in the shell 1 is aligned with the inlet 17, whereby water leaving the wheel 15 enters the conduit 19, rises in the conduit to the bowl 2, which it enters in a whirling motion to thereby flush and scrub the bowl. As the water leaves the bowl 2 it is deflected by the kicker plate 11 inwardly, striking the rotatable member 12 approximately centrally. Leaving the grinders, the water falls into the shell 1 and out the outlet 4.

The bearing mount of this invention is particularly important in the above application, to prevent water from entering the bearings either from the water falling on the rotatable member 12 or rising in the shell due to flooding resulting from clogged drains.

In the preferred embodiment of the invention as applied to the problem in the above described art, the bottom 20 of the shell 1 is provided with a central hollow boss 21 having the bottom portion thereof tapped to receive a threaded adjusting plug 22 for a shaft 23 press-fitted into said hollow boss 21. A shoulder 25 is provided on the shaft 23 to stop the longitudinal motion in one direction of a ball bearing assembly 26 in the other direction press-fitted onto the shaft 23. The longitudinal movement of this lower ball bearing assembly 26 is prevented by a stop or retaining ring 27, which is split, and preferably of spring steel or other suitable material, for ease in inserting it in an annular recess 28 provided in the hollow boss 29 of the rotatable member 12. The annular recess 28 is substantially above the lower end of the boss 29 to thereby provide an elongated hollow projection 30 beneath the lowest section of the lowest ball bearing assembly 26. When the top of the hollow boss 29 is sealed off, as later described, the hollow projection 30 functions as a diving-bell protection for the bearing in case of flooding of the shell 1. This projection 30 should be sufficiently long to provide a factor of safety considering possible depth of submersion, air temperature and water temperature for gaseous contraction and compressibility.

It is usually advisable to provide a plurality of ball bearing assemblies 26 for increased efficiency and proper guide and alignment; accordingly, the bearing mount has been illustrated with two such ball bearing assemblies 26. Positioned in the boss 29 is another recess 29 which receives another split retaining ring 27, on which a ball bearing assembly 26 rests preventing longitudinal motion on the shaft in one direction. A nut 33 engaging the threaded section 34 of the shaft 23 prevents longitudinal movement of the upper ball bearing assembly in the other direction when the nut is screwed down upon the shaft until it contacts the ball bearing assembly. When it is desirable to have more than two ball bearing assemblies in the bearing mount, ball bearing assemblies may be added intermediate those illustrated by using retaining rings on each side thereof.

To provide the protection of the diving-bell seal, the top of the hollow boss 29 must be hermetically sealed. This may be accomplished in various ways, as, for example, by first sealing a water-resistant impervious membrane 35, such as water-proof fabric, across the opening using any suitable water-resistant impervious adhesive, such as rubber cement or the like. To further reinforce this membrane 35 and provide additional seal security, a rigid water-resistant impervious plate 36 is positioned over the membrane 35 and is then sealed to the rotatable member 12 with water-resistant impervious adhesive. The plate 36 may be further sealed to the rotatable member 12 by providing an annular rib on the member 12 around which a downward annular flange provided on the plate 36 may be snapped, similar to that sealing means employed for capping bottled beverages, fruits, vegetables, jellies, and the like.

The ball bearing assemblies 26 described herein may be standard assemblies with inner and outer races—and are packed with a standard water-resistant grease.

The device of this invention has been described with respect to its preferred use; however, it is not to be construed as so restricted or limited. It has a wide variety of uses in many arts. Also, the scope of the invention is not to be limited to the particular construction illustrated and described, as mechanical equivalents may be substituted for specific members and arrangements of parts may be changed without departing from the spirit and scope of the invention. For example, in lieu of the retaining ring arrangement illustrated and described, annular ribs may be provided in the boss of the rotatable member, although the cost of construction might be greater. The invention, therefore, is to be measured by the appended claims and construed as broadly as the prior art will permit.

Having thus described my invention, what I claim as new and wish to secure by United States Letters Patent is:

1. In combination, a shell adapted to contain a liquid, a shaft mounted in the shell and projecting upwardly through the liquid, a rotatable member mounted on the upper end of the shaft for rotation about the axis of the shaft, and bearing means for supporting the rotatable member on the shaft, said rotatable member having a downwardly opening recess into which the upper end of the shaft extends with the bearing means located within said recess and interposed between said upper end of the shaft and the rotatable member, the walls of said recess being hermetically closed from the bearing means upwardly, whereby the entrapment of air within the recess prevents the liquid in the shell from contacting the bearing means even though the level of the liquid rises above said bearing means.

2. In combination, a shell adapted to contain a liquid, a shaft mounted in the shell and projecting upwardly through the liquid, a rotatable member mounted on the upper end of the shaft for rotation about the axis of the shaft, bearing means for supporting the rotatable member on the shaft, said rotatable member having a hollow boss adapted to receive the upper end of the shaft with the bearing means located within the boss, interposed between the inner walls of the boss and the upper end of the shaft, and spaced from the lower end of the boss, and a removable closure for the upper end of the boss, said closure hermetically sealing the upper end of the boss, whereby air is entrapped within the boss as the level of the liquid rises above the level of said bearing means to thereby keep said level of the liquid from reaching said bearing means.

3. The combination with a shell, through which a liquid normally flows, of a rotatable member mounted in the shell and on bearing means for rotation about a vertical axis, said bearing means including a vertically positioned shaft, a hollow boss on the rotatable member adapted to receive the upper end of the shaft, and a bearing within the boss spaced from the bottom of the boss for rotatably supporting said member on said shaft, said boss being hermetically sealed at the top whereby the building up of the liquid level within the shell cannot place the liquid in contact with the bearing because of the entrapment of air within said hermetically sealed boss.

4. The combination with a shell, through which a liquid normally flows, of a rotatable member mounted in the shell and on bearing means for rotation about a vertical axis, said bearing means including a vertically positioned shaft, a hollow boss on the rotatable member adapted to receive the upper end of the shaft, and a bearing within the boss spaced from the bottom wall of the boss for rotatably supporting said member on said shaft, said boss being hermetically closed at the top by a water-resistant impervious membrane extending across the upper open end of the boss, and reinforced by a rigid water-resistant impervious plate, whereby the building up of the liquid level within the shell cannot place the liquid in contact with the bearing because of the entrapment of air within said hermetically sealed boss.

5. The combination with a shell, through which a liquid normally flows, of a rotatable member mounted in the shell and on bearing means for rotation about a vertical axis, said bearing means including a vertically positioned shaft, a hollow boss on the rotatable member adapted to receive the upper end of the shaft, and a bearing within the boss spaced from the bottom wall of the boss for rotatably mounting said member on said shaft, said boss being hermetically sealed at the top whereby the building up of the liquid level within the shell cannot place the liquid in contact with the bearing because of the entrapment of air within said hermetically sealed boss.

6. In combination, a shell adapted to contain a liquid, a shaft member mounted in the shell and projecting upwardly through the liquid, a second member mounted on the upper end of said shaft member for relative rotary movement, and bearing means for supporting said second member on said shaft member, said second member having a downwardly opening recess into which the upper end of the shaft member extends with the bearing means located within said recess and interposed between said upper end of the shaft member and said second member, the walls of said recess being hermetically closed from the bearing means upwardly, whereby the entrapment of air within the recess prevents the liquid in the shell from contacting the bearing means even though the level of the liquid rises above said bearing means.

7. In combination with a shell through which a liquid normally flows, a vertically positioned shaft mounted in the shell and having an upwardly facing shoulder, a rotatable member having a hollow boss adapted to receive the upper end of the shaft, and bearing means for mounting the rotatable member on said shaft, said bearing means including an inner race resting upon said upwardly facing shoulder and having means for clamping it firmly against said shoulder, the lower end of said bearing means being spaced from the lower end of said boss, and said boss being hermetically sealed at the top, whereby the building up of liquid level within the shell cannot place the liquid in contact with the bearing means because of the entrapment of air within said hermetically sealed boss.

HAL WEIR McPHERSON.

REFERENCES CITED

The following references are of record in the file of this patent:

UNITED STATES PATENTS

| Number | Name | Date |
| --- | --- | --- |
| 1,278,060 | Swenson | Sept. 3, 1918 |
| 1,421,009 | Inman | June 27, 1922 |
| 1,753,339 | Hencken | Apr. 8, 1930 |
| 2,035,485 | Kuhlengel | Mar. 31, 1936 |
| 2,253,754 | Bousman | Aug. 26, 1941 |
| 2,282,883 | Powers | May 12, 1942 |
| 2,291,356 | Simonds | July 28, 1942 |
| 2,481,452 | Sherwood | Sept. 6, 1949 |